United States Patent
Seth et al.

(10) Patent No.: US 6,384,365 B1
(45) Date of Patent: May 7, 2002

(54) REPAIR AND FABRICATION OF COMBUSTION TURBINE COMPONENTS BY SPARK PLASMA SINTERING

(75) Inventors: Brij B. Seth, Maitland; Greg P. Wagner, Apopka, both of FL (US); Gary W. Swartzbeck, North Huntingdon, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/549,462

(22) Filed: Apr. 14, 2000

(51) Int. Cl.$^7$ .............................. B23K 28/00; B23P 6/00
(52) U.S. Cl. .................................. 219/76.13; 29/889.1
(58) Field of Search ........................... 219/76.13, 76.1, 219/76.14, 76.16, 149; 29/889.1

(56) References Cited

U.S. PATENT DOCUMENTS

| | | |
|---|---|---|
| 3,241,956 A | 3/1966 | Inoue |
| 3,250,892 A | 5/1966 | Inoue |
| 5,554,837 A | 9/1996 | Goodwater et al. |

OTHER PUBLICATIONS

Hensley, Jr. et al., "Plasma–Activated Sintering (PAS): A New Consolidation Method for Difficult–to–Sinter Materials", Powder Metallurgy in Aerospace, Defense and Demanding Applications—1993; Proceedings of the Third International Conference, 1993, pp. 309–315, Metal Powder Industries Federation.

Venkataswamy et al., "Mechanical alloy processing and rapid plasma activated sintering consolidation of nanocrystalline iron–aluminides," *Materials and Engineering*, 1996, pp. 153–158, Elsevier Science S.A.

Tokita, "Mechanism of Spark Plasma Sintering," Proceedings of the International Symposium on Microwave, Plasma and Thermochemical Processing of Advanced Materials, 1997, pp. 69–76, Joining and Welding Research Intsitute, Osaka University.

*Primary Examiner*—Tom Dunn
*Assistant Examiner*—Zidia Pittman

(57) ABSTRACT

A method of consolidating or repairing turbine component parts, such as turbine blades (10), requires providing a turbine component part (60, 61, 62, 63), establishing a contact pressure between the opposing surfaces (40, 42), where, optionally, fine particles may be present between such surfaces (40, 42), and then generating an electrical field to provide heat, and applying pressure on the opposing surfaces, resulting in high temperature spark plasma sintering to provide a consolidated turbine blade (50).

17 Claims, 2 Drawing Sheets

REPAIR AND FABRICATION OF COMBUSTION TURBINE COMPONENTS BY SPARK PLASMA SINTERING

BACKGROUND OF THE INVENTION

1. Field of the Invention

The invention relates generally to a plasma sintering process for repair and fabrication of combustion turbine components which will provide improved results over repair techniques such as welding or wide gap brazing, for applications such as repair of cracked turbine blades or vane segment platforms; and which will allow manufacture of complex components for which casting processes are not cost effective.

2. Background Information

Utilities and other power producers have been adding capacity or replacing existing steam generators with smaller, more efficient combustion turbines. The higher efficiencies of the combustion turbines have been realized via higher operating temperatures which typically require use of gamma prime strengthened, nickel base superalloys for components such as blades and vanes. Due to the high replacement costs of these hot section components, development of new and improved repair processes is essential. Also, the advanced turbine systems typically require use of directionally solidified and single crystal hot section components. However as the design complexities and component size increase, the ability to cast single piece components in a cost effective manner decreases. In many cases, advance blade and vane design will require complex cooling geometries for which conventional casting processes are not possible.

In the past, gas tungsten arc welding has been a main primary repair process. However, the gamma prime strengthening mechanism used in manufacturing these superalloys results in hot cracking (during welding) or and/or strain age cracking (during post weld heat treatment) of the heat affected zones or of the weld metal itself. In order to alleviate this situation, repairs have been made using lower strength, solid solution strengthened filler alloys such as IN 625 (sold commercially by INCO International) for repair. Because of the poorer mechanical properties of the weld metal and high probability of microfissures in the heat affected zones, repairs have been limited to non-critically stressed regions of components. Advanced welding procedures utilizing high strength filler metals continue to result in inferior creep and fatigue properties.

In U.S. Pat. No. 5,554,837, (Goodwater et al.), laser welding a powder alloy feed, after preheating the weld area and an adjacent region to a ductile temperature, was used during manufacture and repair of jet engine components that operate at temperatures of up to 1093° C. (2000° F.). The problem solved there was, that as a result of such high temperature demands the components usually are manufactured from superalloys containing a gamma-prime phase and materials commonly known as the MCrAlY family of alloys. One particular problem with the gamma-prime precipitation hardenable alloys is the inability to weld or clad these alloys with like or similar alloys without encountering cracking and high production rejects. Because of the welding temperatures and stresses involved, these alloys encounter shrinkage, stress cracking and the like. Due to the difficulties in welding these specific superalloys, there is a need for a process by which gamma-prime precipitation hardened alloys can be joined consistently, without cracking, with similar or parent metal alloys.

Many years ago, sintering of discrete bodies by effecting a spark discharge between the bodies was disclosed by Inoue, in U.S. Pat. Nos. 3,250,892 and 3,241,956. This process involved disposing a mass of discrete electrically fusible particles, preferably consisting predominantly of conductive metallic bodies between a pair of electrodes which sustain a spark discharge. Since this mass tends to shrink as sintering proceeds, means were provided to maintain the electrodes in contact with the mass. To this end, the electrode means could be spring or gravity loaded to maintain the contact and, if desired, a mechanical pressure up to 100 kg./cm$^2$ was provided, when required. The spark discharge could be terminated upon the particles being welded together, at least preliminarily, while passage of the electric current could be continued without development of the spark to weld the particles further by resistance heating. A variety of articles were made using this process: nickel and cobalt discs, bodies of copper with carbon or lead and bodies of cadmium oxide.

Intermetallic compounds, such as $Fe_3Al$ have been mechanically alloyed ("MA") and then disks 10–20 mm in diameter were prepared using plasma activated sintering ("PAS"), as described in "Mechanical Alloying Processing and Rapid Plasma Activated Sintering Consolidation of Nanocrystalline Iron-Aluminides", *Materials Science and Engineering*, A207 (1996) pp. 153–158, by M. A. Venkataswamy et al. The PAS consolidation provided high density values in a very short time, and a very fine grain structure was maintained. PAS has also been utilized to consolidate difficult-to-sinter powders to provide AlN, $Nb_3Al$ and superconducting $(Bi_{1.7}, Pb_{0.3})$—$Sr_2Ca_{2.1}Cu_{3.1}O_x$ ceramics with absence of significant grain growth during densification, as described in "Plasma-Activated Sintering (PAS): A New Consolidation Method For Difficult-to-Sinter Materials", *Powder Metallurgy in Aerospace, Defense and Demanding Applications—Proceedings of the 3$^{rd}$ International Conference*, published by the Metal Powder Industries Federation, (1993) pp. 309–315, by J. Hensley et al. They mention that common methods of consolidating ceramic and metallic powders include sintering, hot pressing, or hot isostatic pressing, which processes typically require long exposure (one to several hours) at high temperature, leading to grain coarsening of the microstructure and the formation of grain boundary impurities. The plasma-activated sintering (PAS) process significantly reduces the sintering times of many materials. In the PAS process, a spark plasma sintering process, the commercial powders are poured into carbon molds without additives, binders, or pre-pressing. Uniaxial pressure is applied to the powder and an external power source provides a pulsed current to activate the surface of the particles. The power supply is then switched to resistance heating for densification. To measure the sintering temperature, a thermocouple is inserted into the carbon mold and a linear gauge measures the shrinkage. They mention that the first commercial use of PAS was to manufacture Fe—Nd—Co—B magnets around 1990.

M. Tokita, in "Mechanism of Spark Plasma Sintering", *Proceedings of the International Symposium on Microwave, Plasma and Thermochemical Processing of Advanced Materials*, published by the Joining and Welding Research Institute, Osaka University (1997) pp. 69–76, describes SPS as being based on a high temperature plasma (spark plasma) momentarily generated in the gaps between powder materials by electrical discharge at the beginning of pulse energizing. The large current pulse energizing method generates: (1) spark plasma, (2) spark impact pressure, (3) Joule heating, and (4) an electrical field diffusion effect. The SPS process is regarded as a rapid sintering method, using self-heating action from inside the powder, similar to self-propagating high temperature synthesis (SHS) and microwave sintering. That article states that SPS systems offer many advantages over conventional systems using hot press (HP) sintering, hot isostatic pressing (HIP) or atmospheric furnaces, including ease of operation and accurate control of sintering energy as well as high sintering speed, high reproducibility, safety and reliability. The SPS process is expected to find increased use in the fabrication of functionally graded materials (FGMs), intermetallic compounds, fiber reinforced ceramics (FRC), metal matrix composites (MMC) and nanocrystalline materials, which are difficult to sinter by conventional sintering methods. Tokita explains that there was little literature on research into this process until the latter half of the 1970s. The second generation was developed from the middle of the 1980s to the early 1990s. These units were small experimental systems-Plasma Activated Sintering (PAS) with maximum sintering pressure of around 5 tons and pulse generators of up to 800 amp, used primarily for materials research. However, the third generation of this advanced technology utilizes systems with large DC pulse generators of 10 to 100 tons and 2,000 to 20,000 amp and more, which have gained a reputation as new industrial processes for synthetic processing of gradient and composite materials. Uses are listed as consolidating ceramics and cermets; polyamide, nylon and polyethylene resins; fiber/particle compounds; and magnets; intermetallics and hard metal alloys. Suitable materials for SPS processing included Fe, Ni, Cr, Sn, Ti, Q, Al—virtually any metal; carbides such as SiC; nitrides such as $Si_3N_4$: intermetallics such as TAl, $MoSi_2$, NiAl, NbCo; borides; fluorides; and cermets such as $Al_2O_3$+TiC.

SUMMARY OF THE INVENTION

It is one of the main objects of this invention to provide a method of bonding sections of high temperature superalloy components, such as turbine blade sections, turbine blade tips, turbine blade root ends, and turbine vane components, by an improved sintering technique to provide high density bonding for either repair or construction of turbine components in a rapid fashion.

These and other objects of the invention are accomplished by a method of consolidating turbine component parts comprising the steps: (a) providing a turbine component part having at least two approximate opposing surfaces; (b) establishing contact pressure between the approximate opposing surfaces; (c) disposing electrodes in close proximity to the approximate opposing surfaces; (d) generating an electrical field to provide heat, and applying additional pressure on the opposing surfaces, resulting in cleaning and short-time high temperature spark plasma sintering between of the opposing surfaces; (e) reducing the electric field; (f) subjecting the two approximate opposing surfaces to additional continuing pressure; and (g) maintaining the pressure while cooling the turbine component approximate opposing surfaces. This general process could be used to mate multiple surfaces in a construction process. This process is particularly valuable in mating surfaces having different compositions and may be very useful in mating single crystal opposing surfaces. These steps, (a) through (g), are illustrated in FIG. 5, where step (a'), shown with dotted lines, involves placing metal alloy powder between the approximate opposing surfaces. In some instances, this process might be useful for bonding ceramic opposing surfaces, optionally using ceramic particles between the surfaces.

The invention also resides in a method of repairing turbine component parts comprising the steps: (a) providing a turbine component having at least two approximate opposing surfaces; (b) inserting discrete powder, having a similar composition to at least one of the surfaces, between the at least two approximate surfaces, so that there is substantial contact pressure between the discrete particles and between the particles and the two approximate opposing surfaces of the turbine component; (c) disposing electrodes in close proximity to the opposing surfaces; (d) generating an electrical field to cause heat, and applying additional pressure between the particles, resulting in cleaning and short-time high temperature spark plasma sintering at the surface of the particles and at the approximate opposing surfaces, with deformation of the inserted particles and high speed diffusion and plastic flow of the particle material; (e) reducing the electric field between the approximate opposing surfaces; and (f) cooling the turbine component approximate opposing surfaces and the particulate material between the approximate opposing surfaces.

This process would allow repair and manufacture of complex turbine components for which casting processes are not cost effective and bonding of hybrid components in a quick operation with very short sintering times.

BRIEF DESCRIPTION OF THE DRAWINGS

These and other advantages of the invention will become more apparent from the following description in view of the drawings, where.

DESCRIPTION OF THE PREFERRED EMBODIMENTS

Figure 1:
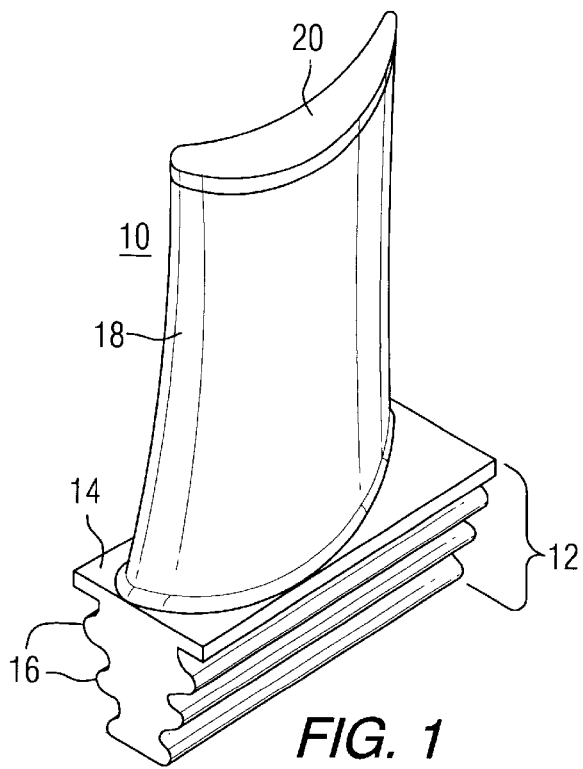
FIG. 1 is a perspective view of a standard superalloy turbine blade, showing areas of erosion or foreign object damage.

Referring now to FIG. 1, a turbine blade 10 is shown, having a root portion 12 containing a platform 14 and a series of ridges 16 for attachment to a turbine disc. The blade 10 has an airfoil section 18 and can, for example, have a separate, attached tip portion 20 bonded to the blade. The blade can be made of a conventional cobalt superalloy or single crystal nickel-based superalloy, usually containing Cr, Al and Mo, among other component elements, for example Ni.Cr.Al.Co.Ta.Mo.W, as is well known in the art, as in U.S. Pat. No. 4,039,330 (Shaw). If the blade as covered with a base coat of, for example, MCrAlY, and/or with an outer thermal barrier ceramic coating ("TBC"), such as a stabilized zirconia coating, the coating should be completely removed.

Electrodes of a spark discharge sintering apparatus, similar to those described in U.S. Pat. Nos. 3,241,956 and 3,250,892, would be positioned in close proximity to the approximate opposing surfaces. The apparatus would be operated to generate an electrical field across the powder to cause heat and pressure between the particles, possibly causing a high temperature spark discharge between the electrodes and between the discrete particles packed between the opposing surfaces. The apparatus is operated to generate a local, momentary, high temperature discharge of up to about 1300° C. This results in short-time (less than 5 minutes) heating and spark plasma sintering of the surface of the metal or ceramic particles to each other and to the approximate opposing surfaces. This also causes some degree of deformation of the particles, high speed diffusion, and a substantial amount of plastic flow of the particle material, so that the sintered compact is about 98% to 99% of the theoretical density, that is, 98% to 99% dense. The electric field is then reduced, allowing the turbine component approximate surfaces and the particulate material within the gap to cool. This process could provide substantial advantages in allowing ease of bonding of dissimilar materials. For example, it may be used to bond dissimilar alloys or non-single crystal alloys to single crystal alloys.

Figure 2:
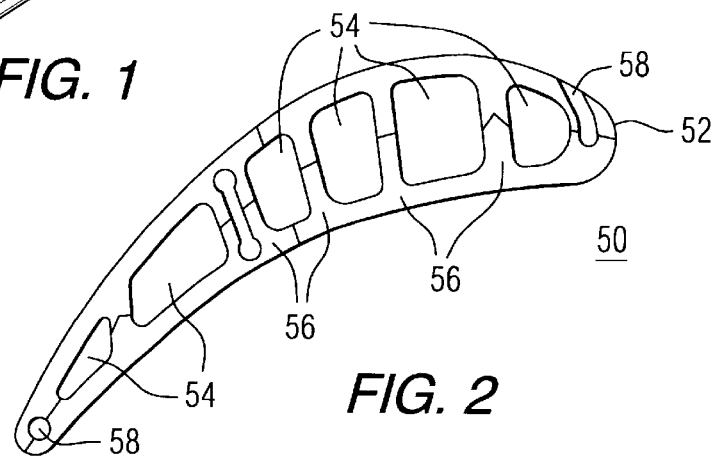
FIG. 2 is a cross-section through a consolidated turbine blade.

FIG. 2 shows a cross-section of a consolidated, 4-part turbine blade 50 with airfoil section 52, a variety of passageways 54 with support bracing 56 and cooling channels 58. Complex turbine components like these can be assembled and consolidated into a unitary, bonded structure by a broad embodiment of the method of this invention. Using the method of this invention allows consolidation of multiple part components, allowing casting and machining smaller parts prior to consolidation.

Figure 3:
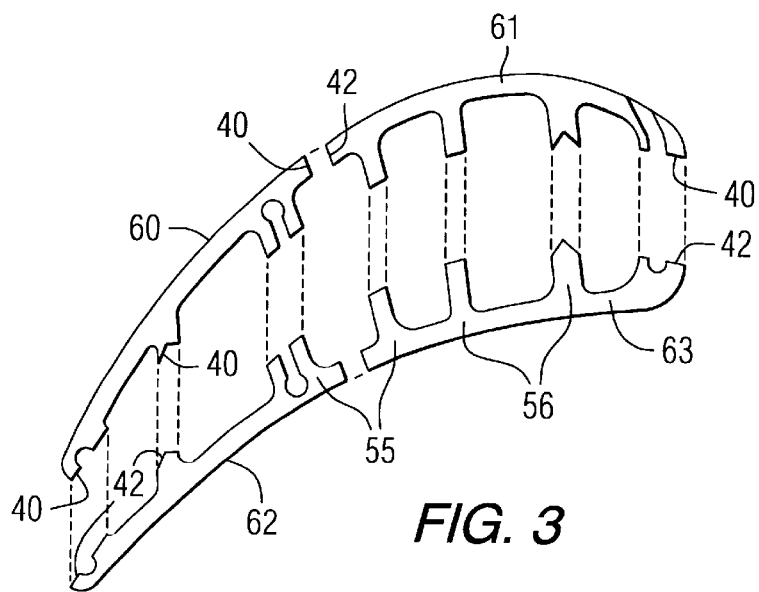
FIG. 3, which best shows the invention, is a cross-section of the turbine blade of FIG. 2 before consolidation, showing the complex surfaces that must be mated and bonded together.

FIG. 3 shows the same blade prior to being bonded together and after being machined so that sections 60 and 61 will mate with sections 62 and 63, as shown by the dotted lines. Approximate opposing surfaces are shown as 40 and 42. A method to mate/bond components with complicated shapes, such as that shown in FIG. 3, would include the initial steps of machining two or more opposing turbine component surfaces, so that they will mate to form a consolidated whole upon bonding; optionally, contacting the approximate opposing surfaces with a thin layer of discrete metal or ceramic particles; establishing contact pressure between the two approximate opposing surfaces by joining them, applying pressure and holding them in place by a bracing means; and disposing electrodes in close proximity to the approximate opposing surfaces. In FIG. 3, sections 60 and 61 could be joined first, sections 62 and 63 could be joined next, and then the two halves joined in a third operation, or all the sections could be joined at one time, depending on the equipment available for electrode placement. On a production line, the discharge sintering apparatus, such as previously discussed, would be custom tailored and placed for the specific type of turbine component to be joined.

An electric field would then be generated to provide heat on the opposing surfaces and on any metal or ceramic particles therebetween, resulting in short-time, high temperature melt sintering of the opposing surfaces and deformation and plastic flow of any metal or ceramic particles, all as described previously. An auxiliary ram could apply additional pressure, if desired. The electric field would then be reduced, allowing the turbine component approximate surfaces and any particulate material therebetween to cool, preferably while still held by the bracing means, under the same or additional pressure.

Figure 4:
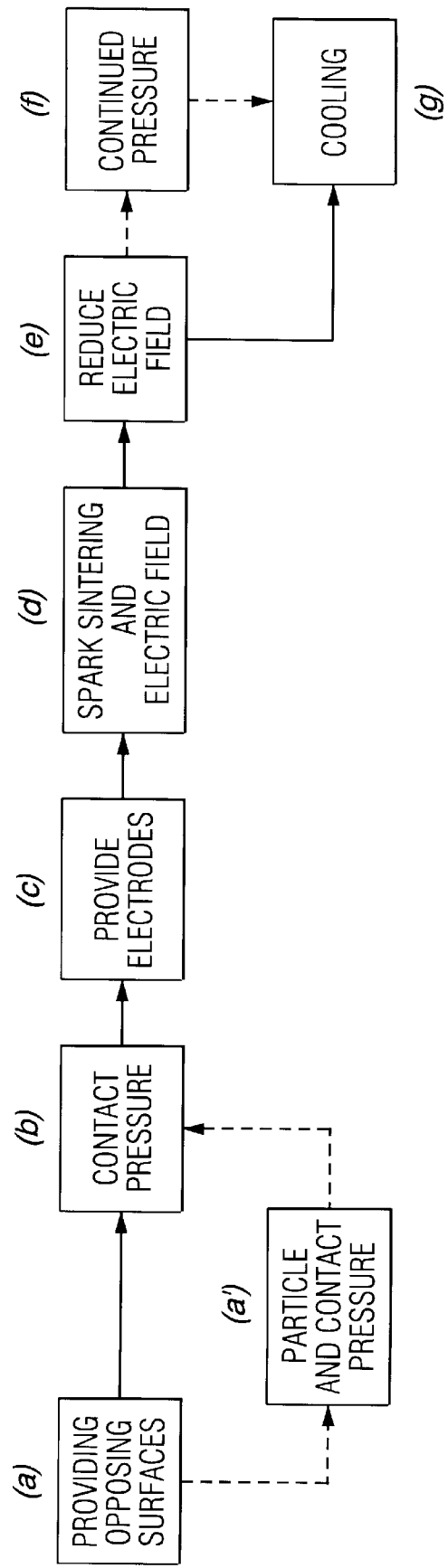
FIG. 4 is a block diagram of the method of this invention.

Both the repair and the manufacturing processes described, shown generally in FIG. 4 as steps (a) to (g), are viable for conventionally-cast equiaxed, directionally solidified and single crystal components. Step (b) includes powder contact pressure. As shown, step (f), providing additional continued pressure, may not be necessary in some cases. The repair process, previously described, may be used as a replacement for conventional weld repair or for repair of more critically stressed component locations where weld repair is not now suitable. Hot cracking and strain age cracking within the repair site which occur during and subsequent to conventional repair can now be avoided while achieving mechanical properties approaching those of the parent materials. Applications such as, but not limited to, crack repair of vane segments and blade platforms are examples.

Standard grinding or machining techniques would used to remove crack remnants. The process utilize can a powder filler material with a composition, including gamma prime strengthening elements, which approximates that of the base materials being repaired. Die and punch assemblies would preferably constrain the powder filler to the joining area. The discharge plasma generated by the pulsed power characteristics of the process provides cleaning action critical for removal of surface oxides within the powder compact. The application of pressure and direct and indirect resistance heating of the powder compact by a die assembly results in rapid sintering times of the order of five minutes or less.

The manufacturing process covers bonding complex shapes which cannot be case in a cost effective manner or for where casting as a complete assembly is not possible. Examples are vane segment end caps and airfoils. The process can also be used to fabricate hybrid assemblies from combinations of conventionally-cast equiaxed, directionally solidified or single crystal segments. Manufacture of hybrid components allows one to utilize the unique properties of these microstructures to optimize, for example, the creep properties in one section of the component and fatigue properties in another area.

What is claimed is:

1. A method of repairing a combustion turbine component comprising the steps of:
   (a) providing a worn or damaged turbine component part having at least two approximate opposing surfaces, and a base coat and a thermal barrier coating on the approximate opposing surfaces;
   (b) removing the base coat and the thermal barrier coating from the approximate opposing surfaces;
   (c) disposing electrodes in close proximity to the approximate opposing surfaces;
   (d) generating an electric field to provide heat, and applying additional pressure on the opposing surfaces, resulting in cleaning and short-time high temperature spark plasma sintering between the opposing surfaces within 5 minutes at a temperature up to 1300° C.;
   (e) reducing the electric field;
   (f) subjecting the two approximate opposing surfaces to additional pressure; and
   (g) maintaining the pressure while cooling the turbine component approximate opposing surfaces.

2. The method of claim 1, where there are spark discharges between the electrodes during step (d).

3. The method of claim 1, where the turbine opposing surfaces are superalloy material.

4. The method of claim 1, where the turbine component part is a superalloy coated with ceramic thermal barrier coating, where the ceramic coating has been removed at the opposing surfaces to provide superalloy opposing surfaces.

5. The method of claim 1, where the turbine component part and opposing surface are a superalloy material in single crystal form.

6. The method of claim 1, where metal alloy powder is disposed between the at least two approximate opposing surfaces.

7. The method of claim 1, where the turbine component opposing surfaces are ceramic material, and a ceramic powder is disposed between the at least two approximate opposing surfaces.

8. The method of claim 1, where the turbine component opposing surfaces have different compositions.

9. The method of claim 1, where the turbine component part is part of a turbine or blade, turbine vane.

10. A method of repairing a combustion turbine component comprising the steps of:
  (a) providing a worn or damaged turbine component part having at least two approximate opposing surfaces, and a base coat and a thermal barrier coating on the approximate opposing surfaces;
  (b) removing the base coat and a thermal barrier coating from the approximate opposing surfaces;
  (c) inserting discrete powder, having similar composition to at least one of the opposing surfaces, so that there is substantial contact pressure between the discrete particles and between the particles and the two approximate opposing surfaces of the turbine component;
  (d) disposing electrodes in close proximity to the approximate opposing surfaces;
  (e) generating an electric field to cause heat, and applying additional pressure between the particles, resulting in cleaning and short-time high temperature spark plasma sintering at the surface of the particles and at the approximate opposing surfaces within 5 minutes at a temperature up to 1300° C., with deformation of the inserted particles and high speed diffusion, and plastic flow of the particle material;
  (f) reducing the electric field between the approximate opposing surfaces; and
  (g) cooling the turbine component approximate opposing surfaces and the particulate material between the surfaces.

11. The method of claim 10, where there are spark discharges between the electrodes during step (d).

12. The method of claim 10, where the opposing surfaces are a superalloy material.

13. The method of claim 10, where the turbine component part is a superalloy coated with ceramic thermal barrier coating, where the ceramic coating has been removed at the opposing surfaces to provide superalloy opposing surfaces.

14. The method of claim 10, where the turbine component part and opposing surfaces are a superalloy material in single crystal form.

15. The method of claim 10, where metal alloy powder is disposed between the at least two approximate opposing surfaces.

16. The method of claim 10, where the turbine component opposing surfaces are ceramic material, and a ceramic powder is disposed between the at least two approximate opposing surfaces.

17. The method of claim 10, where the turbine component part is part of a turbine blade or turbine vane.

* * * * *